Dec. 20, 1927.
M. J. TRUMBLE
1,653,137
REMOVABLE COVER CONSTRUCTION
Filed Jan. 22, 1925   2 Sheets-Sheet 1
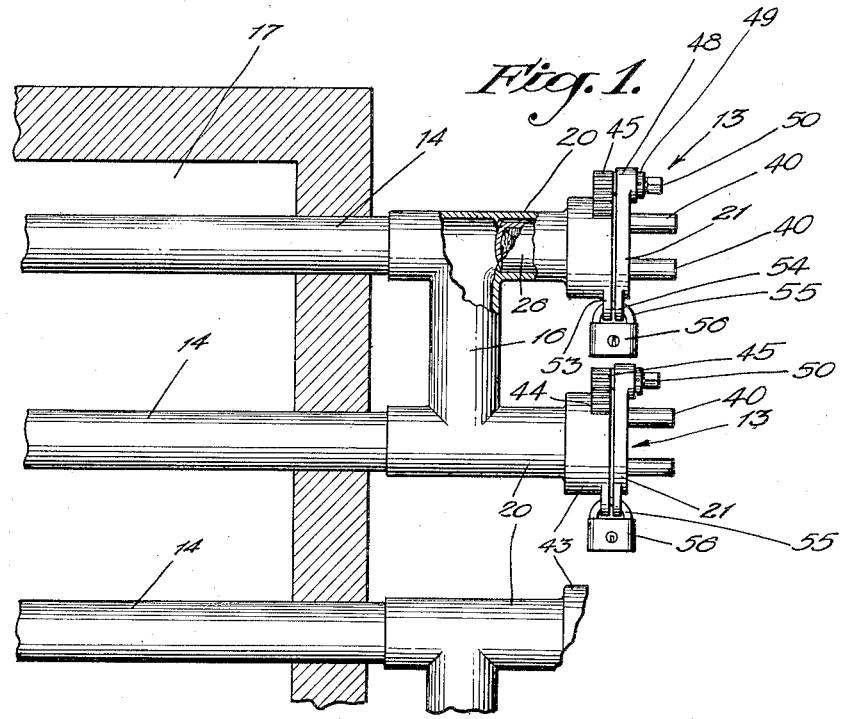
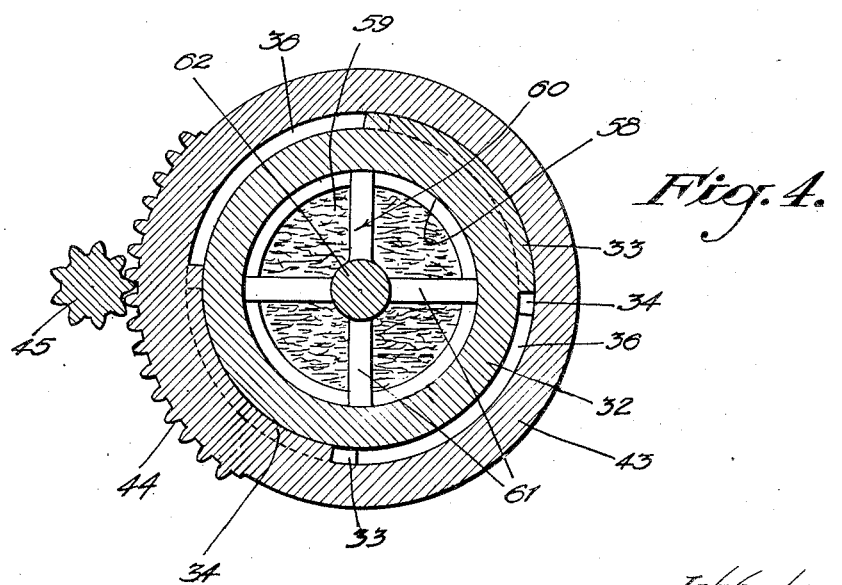
INVENTOR:
MILON J. TRUMBLE,
BY
Ford W. Harris
ATTORNEY.

Dec. 20, 1927.
M. J. TRUMBLE
1,653,137
REMOVABLE COVER CONSTRUCTION
Filed Jan. 22, 1925    2 Sheets-Sheet 2
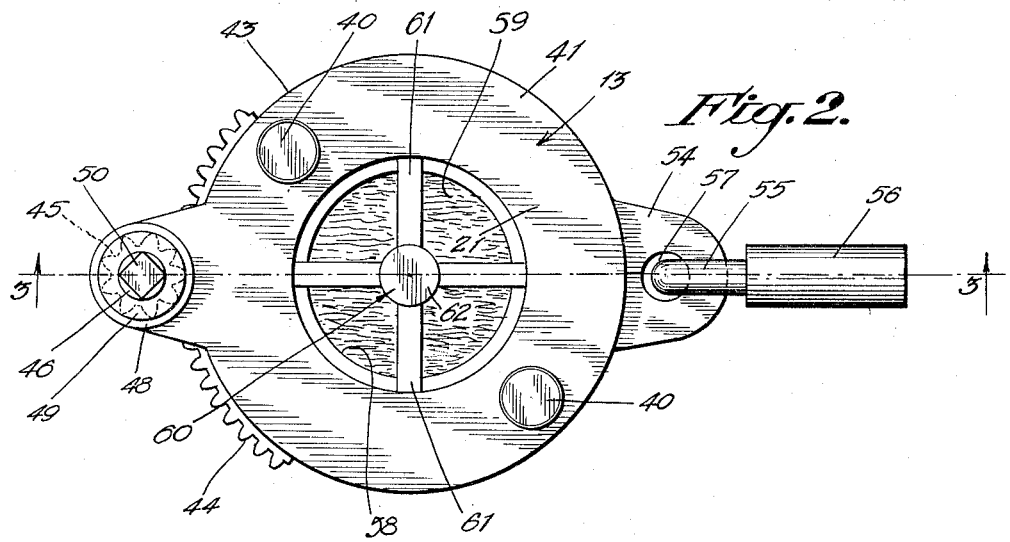
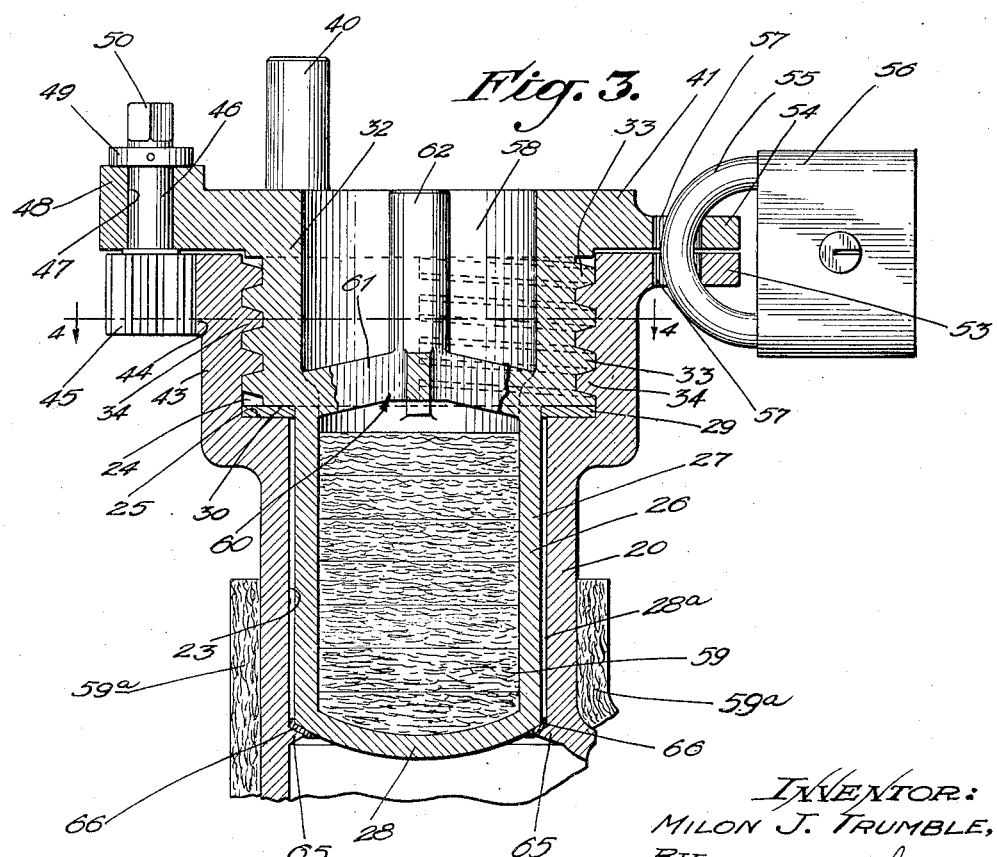
INVENTOR:
MILON J. TRUMBLE,
BY
Ford W. Harris
ATTORNEY.

Patented Dec. 20, 1927.

1,653,137

UNITED STATES PATENT OFFICE.

MILON J. TRUMBLE, OF LOS ANGELES, CALIFORNIA.

REMOVABLE COVER CONSTRUCTION.

Application filed January 22, 1925. Serial No. 4,062.

This invention relates to a removable cover construction which is adaptable for use on any construction in which is it necessary to gain access to the interior thereof, for the purpose of cleaning, inspecting, repairing or for other purposes.

My invention is particularly adapted for use as a removable cover construction for boilers or other apparatus which are subjected to high pressures.

It is an object of my invention to provide a removable cover construction of this character having a cover which is adapted for extremely tight seating. I provide my invention in the form of a cover having thread formations thereon, and a body having thread formations thereon. The cover is adapted for association in such a manner that a cooperation of said thread portions will tightly seat the cover against the body to a degree that will withstand enormous pressures without leakage.

It is a further object of my invention to provide a novel means for tightening said cover. I accomplish this object by providing a pinion and gear arrangement on the cover and body, which is operable to rotate either the cover or the body so as to pressurably seat the cover.

It is also an object of my invention to provide a lock for locking the cover against rotation.

It is a still further object of my invention to provide a construction of the character mentioned in which the cover may be quickly installed and removed from place. I accomplish this by providing the cover and body of the construction with interrupted thread formations. This arrangement allows the cover to be inserted into proper position, and then rotated a partial revolution to effect a tight seating thereof.

It is another object of my invention to provide a removable cover construction of the character mentioned in which surrounding heat is restrained from approaching the threads of the construction. This is important because it prevents the threads from being heated and expanded, which might incur binding. It also prevents the heat from approaching a sealing gasket, which might result in destruction thereof and a leakage of the construction.

Other objects and advantages of my invention will appear in the following description.

Referring to the two sheets of drawings which are solely for illustrative purposes, Fig. 1 is a diagrammatic view illustrating one utility of my invention.

Fig. 2 is a plan view of a cover construction embodying the features of my invention.

Fig. 3 is a section taken substantially on the line 3—3 of Fig. 2.

Fig. 4 is a section taken substantially on the line 4—4 of Fig. 3.

With reference to Fig. 1, I show cover constructions 13 provided for the purpose of giving access to the interior of pipes 14, the cover constructions 13 being shown as a part of a return bend 16. The pipes 14 extend through a furnace 17, the ends of these pipes 14 projecting to the exterior of said furnace and being connected in series by means of the return bends 16. The construction shown in Fig. 1 is a part of a cracking still. Oil is forced through these pipes 14, in which it is subjected to temperatures capable of cracking such oil. The inner walls of these pipes 14 become coked, and it is frequently necessary to clean these pipes. The cover construction 13 of my invention consists essentially of a body construction 20, which in Fig. 1 is shown as being an integral part of the return bend 16, and a cover 21 which is inserted thereinto.

With reference to Figs. 2 to 4, inclusive, the body 20 provides a cylindrical opening 23 and an outer cylindrical enlarged opening 24 formed concentric with the opening 23. An annular shoulder 25 is formed between the openings 23 and 24. A cylindrical cup portion 26 having a cylindrical wall 27 and a closed bottom 28 of the cover 21 extends into the opening 23 of the body 20. The external diameter of the portion 26 is slightly smaller than the diameter of the opening 23, so as to provide a clearance, as indicated at 28ª.

A gasket 29, as shown clearly in Fig. 3, is placed so as to rest against the annular shoulder 25. An annular face 30 of the cover 21 engages an upper face of the gasket 29. In the enlarged opening 24 of the body 20 there rests an upper enlarged cylindrical portion 32 of the cover 21.

Interrupted thread formations 33 are formed on the cylindrical portion 32 of the cover 21 which are adapted to cooperatively engage interrupted thread formations 34 formed in the enlarged opening 24. As shown clearly in Fig. 4, these thread formations 33 and 34 are similar to the thread formations of the breech lock of a cannon. The formations 33 and 34 are oppositely formed and extend a lineal distance substantially one-quarter the circumference of the opening 24.

When installing the cover in place, the cover is positioned so that the thread formations 33 are at a 90° angle with respect to the thread formations 34, so that they may pass downwardly into the opening 24, passing through the spaces 36 between the ends of the formations 34. After the cover has come to this position it is then rotated, thus causing an engagement of the thread formations 33 and 34 and a tight seating of the cover. This arrangement allows the cover to be quickly installed and removed from place. It is obvious that it is necessary to rotate the cover less than a quarter of a revolution, after which it may be lifted axially from place. Were the parts not provided with interrupted threads, it would be necessary to rotate the cover quite a number of times to remove it from place. The arrangement shown saves a great deal of time.

After the cover has been inserted into place, ready to be tightened, this tightening may be accomplished by passing a bar (not shown) between pins 40, which extend from a flange 41 of the cover 21; this bar being swung manually, thus rotating and tightly seating the cover 21.

Also for tightening the cover 21, I provide an arrangement which is very suitable on large constructions where it is necessary to gain considerable leverage to effect the desired tight seating of the cover. On an exterior cylindrical face 43 of the body 20 I provide a segmental gear 44. A pinion 45 carried on a shaft 46 engages the gear 44. This shaft 46 extends through an opening 47 in a lug 48 formed on the flange 41. A collar 49 is pinned to the shaft 46 for holding it in place, and the shaft 46 is of polygonal formation at the upper end 50 thereof for the accommodation of a wrench for effecting a rotation of the pinion 45. By rotating the pinion 45, this pinion 45 is caused to travel along the segmental gear 44. This rotates the cover 21 relative to the body 20, causing an engagement between the interrupted teeth formations 33 and 34, and effecting a tight seating of the cover 21. This arrangement provides a means whereby the cover may be seated with extremely great tightness.

Extending from the body 20 is an ear 53, and extending from the flange 41 of the cover 21 is an ear 54. A hasp 55 of a lock 56 may be extended through openings 57 in the ears 53 and 54 for preventing a rotation of the cover 21.

The cover 21 has a cavity 58. The lower portion of the cavity 58 which extends inside the cylindrical portion 27 is filled with an effective insulating material, as indicated at 59. Also the body may be provided with insulation 59ª, shown only in Fig. 2. The insulating materials 59 and 59ª are provided for the purpose of preventing heat from creeping upwardly along the wall 27 of the cover 21 and the wall of the body 20, and approaching the thread formations 33 and 34. If undue heat should reach these formations, there would result an expansion thereof, which might cause a binding of the formations which would interfere with the removal of the cover. The insulations 59 and 59ª also restrain heat from approaching the gasket 29. Such heat might operate to destroy the gasket 29 and to destroy the effective seal produced between the shoulder 25 and the face 30.

Considerable of the strain placed upon the cover due to the tightening thereof occurs at points adjacent to the annular face 30. To strengthen the cover 21 at these points, I provide a spider 60 which is formed integral with the cover 21. Legs 61 of the spider 60 project inwardly from the wall of the cover and terminate in a central hub 62. By this strengthening construction, it is possible to make the walls of the cover comparatively light without danger of breakage.

At the lower end of the body 20 adjacent to the bottom 28 of the cover 21, there is formed an annular lip 65, as shown clearly in Fig. 3. A minute space exists between the lip 65 and the outer portion of the bottom 28 in which there is placed a calking material 66. This is provided for the purpose of preventing a substance contained in the construction on which the cover is employed, from entering the space 28 between the cup formation 26 and the inner face of the opening 23. For example, if oil carried by the pipes 14 in Fig. 1 crept into the space 28, this oil would congeal due to the heat thereof and would tend to interfere with the placing and the removing of the cover 21. This calking material 66 may be of any suitable material, being preferably provided in the form of a paste which is spread on the outer annular portion of the bottom 28 before the cover is inserted in place. When the paste is subjected to heat, it will harden and form a tight seal at the lower end of the cover 21 and be effective in preventing an entrance of oil into the space 28.

Although I have illustrated my invention as being a part of the return bend 16, it should be clearly understood that it may be used upon various constructions; for example, instead of the body being formed integral with the return bend 16, it might be formed as part of a boiler construction and might be of such a size as to be a man-hole or a hand-hole, or other access.

I claim as my invention:

1. In a cover construction of the class described, the combination of: a body having an opening, said opening being enlarged at one portion so as to form a shoulder; a cover arranged to close said opening; threads formed on said body and said cover for forcing said cover against said shoulder; a segmental gear formed on said body; and a pinion gear carried by said cover, said pinion engaging said segmental gear and being rotatable so as to rotate said cover.

2. In a cover construction of the class described, the combination of: a body having an opening, said opening being enlarged at one portion so as to form a shoulder; a cover arranged to close said opening; interrupted threads formed on said body and said cover for forcing said cover against said shoulder; a segmental gear formed on said body; and a pinion gear carried by said cover, said pinion engaging said segmental gear and being rotatable so as to rotate said cover.

3. In a cover construction of the class described, the combination of: a body having an opening and an enlarged opening formed therein; an annular shoulder situated between said openings; a cover for closing said openings, said cover having a pair of cylindrical formations having an annular face therebetween; threads formed on one of said cylindrical formations; threads formed in said enlarged opening, said threads in said opening being adapted for engaging said threads on a cylindrical portion in such a manner as to seat said annular face against said annular shoulder; means for rotating said cover to cause said threads to seat said annular face; and means for locking said cover against rotation.

4. In a cover construction of the class described, the combination of: a body having an opening and an enlarged opening formed therein; an annular shoulder situated between said openings; a cover for closing said openings, said cover having a pair of cylindrical formations having an annular face therebetween; interrupted threads formed on one of said cylindrical formations; interrupted threads formed in said enlarged opening, said interrupted threads in said opening being adapted for engaging said interrupted threads on a cylindrical portion in such a manner as to seat said annular face against said annular shoulder; means for rotating said cover to cause said interrupted threads to seat said annular face; and means for locking said cover against rotation.

5. In a cover construction of the class described, the combination of: a body having an opening and an enlarged opening formed therein; an annular shoulder situated between said openings; a cover for closing said openings, said cover having a pair of cylindrical formations having an annular face therebetween; threads formed on one of said cylindrical formations; threads formed in said enlarged opening, said threads in said opening being adapted for engaging said threads on a cylindrical portion in such a manner as to seat said annular face against said annular shoulder; means for rotating said cover to cause said threads to seat said annular face; means for locking said cover against rotation; and means for preventing heat from reaching said threads.

6. In a cover construction of the class described, the combination of: a body having an opening and an enlarged opening formed therein; an annular shoulder situated between said openings; a cover for closing said openings, said cover having a pair of cylindrical formations having an annular face therebetween; interrupted threads formed on one of said cylindrical formations; interrupted threads formed in said enlarged opening, said interrupted threads in said opening being adapted for engaging said interrupted threads on a cylindrical portion in such a manner as to seat said annular face against said annular shoulder; means for rotating said cover to cause said interrupted threads to seat said annular face; means for locking said cover against rotation; and means for preventing heat from reaching said threads.

7. In a cover construction of the class described, the combination of: a body having an opening, said opening being enlarged at one portion so as to form a shoulder; a cover arranged to close said opening; threads formed on said body and said cover for forcing said cover against said shoulder; means to prevent material within said body from contact with said threads; a segmental gear formed on said body; and a pinion gear carried by said cover, said pinion engaging said segmental gear and being rotatable so as to rotate said cover.

8. In a cover of the class described, the combination of a body having an opening, said opening having an enlarged portion whereby to produce an annular shoulder midway thereof, a cover of cylindrical form having portions of different diameter to enter said openings, an internal interrupted thread in the enlarged portion of said opening, an interrupted external thread upon the larger portion of said cover to coact with said first named threads, a gasket seated upon said shoulder and against the annular shoulder between said cylindrical portions, the smaller cylindrical portion entering said opening with clearance therein, means to prevent contents of the body from entering said clearance a segmental gear carried by said body, a planetary pinion carried by said cover meshing with said gear whereby to provide leverage to firmly seat said cover.

9. In a locking manhole cover and frame construction the combination of a manhole frame and a cover therefor, means to wedge lock the frame and cover together upon slight relative arcuate movement of the same, and means to cause such relative arcuate movement of the cover and frame including teeth rigid with one of the same and a rotatable pinion carried by the other including teeth intermeshing with said first mentioned teeth.

10. In a device of the class described, a manhole frame, a manhole cover, means by which to lock the cover on the frame upon slight arcuate movement of the cover on the frame, a series of teeth rigid with the frame, and a key rotatably carried by the cover including teeth for meshing with the teeth of the frame.

11. In a device of the class described, a manhole frame, a manhole cover, teeth rigid with the frame, a key rotatably carried by the manhole cover having a pinion with teeth meshing with the teeth of the frame, whereby upon rotation of the key the cover may be rotated on said frame, and locking means constructed with the frame and cover for movement into or out of locking relation upon movement of the cover and the frame.

12. In a device of the class described a manhole cover, a manhole frame adapted to receive the cover, ratchet teeth rigid with the frame, said cover having an opening therein, a key adapted to be rotatably positioned in the manhole cover opening, means to so support the key in said opening, said key having a plurality of teeth adapted to mesh with the ratchet teeth of the frame when the cover is upon the frame, whereby upon the movement of the key the cover may be rotated in the frame, and locking means carried by the frame and cover adapted to be moved into or out of cooperative relation incident to rotation of the cover on the frame.

In testimony whereof, I have hereunto set my hand at Los Angeles, California, this 16th day of January, 1925.

MILON J. TRUMBLE.